(12) United States Patent
DuBose et al.

(10) Patent No.: US 6,780,227 B2
(45) Date of Patent: Aug. 24, 2004

(54) METHOD OF SPECIES EXCHANGE AND AN APPARATUS THEREFORE

(75) Inventors: Ronald Arthur DuBose, Marietta, GA (US); Craig Hanson, Acworth, GA (US); Peter J. Fehl, Atlanta, GA (US); Robert Matus, Douglasville, GA (US)

(73) Assignee: Emprise Technology Associates Corp., Marietta, GA (US)

( * ) Notice: Subject to any disclaimer, the term of this patent is extended or adjusted under 35 U.S.C. 154(b) by 260 days.

(21) Appl. No.: 09/975,870

(22) Filed: Oct. 12, 2001

(65) Prior Publication Data

US 2002/0071979 A1 Jun. 13, 2002

Related U.S. Application Data

(60) Provisional application No. 60/304,493, filed on Jul. 11, 2001, and provisional application No. 60/240,181, filed on Oct. 13, 2000.

(51) Int. Cl.$^7$ .............................................. B01D 53/06
(52) U.S. Cl. ............................. 96/125; 96/130; 96/150; 96/154
(58) Field of Search .................. 96/108, 118, 123–127, 96/130–133, 138, 150, 151, 154

(56) References Cited

U.S. PATENT DOCUMENTS

| | | | |
|---|---|---|---|
| 2,038,071 A | | 4/1936 | Wilhelm |
| 2,617,986 A | * | 11/1952 | Miller .......................... 96/125 |
| 2,792,071 A | * | 5/1957 | Pennington ................... 96/118 |
| 3,112,184 A | | 11/1963 | Hollenbach |

(List continued on next page.)

FOREIGN PATENT DOCUMENTS

| | | |
|---|---|---|
| DE | 39 02 101 A1 * | 7/1990 |
| FR | 2583990 A1 * | 1/1987 |
| WO | WO 91/16964 A1 * | 11/1991 |

OTHER PUBLICATIONS

Ronald Arthur Dubose, Fuel Cell Engine Stream Conditioning System, U.S. patent application No. 09/447,764, Filed Nov. 23, 1999.

*Primary Examiner*—Robert H. Spitzer
(74) *Attorney, Agent, or Firm*—Todd Deveau; Thomas, Kayden, Horstemeyer & Risley LLP

(57) ABSTRACT

A species transfer device in communication with at least two streams, one stream having a higher potential of a species than a lower potential stream. The species transfer device is capable of removing a portion of the species from the high potential stream, and transferring the removed species into the low potential stream. The species transfer device incorporates a housing assembly, exchange matrix and optionally, a sorbent. The housing assembly contains both the exchange matrix and optionally a sorbent inside a housing enclosure and between a sealing enclosure, and provides for the entrance and exhaust of the first and second streams therethrough. The exchange matrix can be, but need not be, in the form of a wheel having an average linear coefficient of thermal expansion at 25 to 800° C. of less than about $20 \times 10^{-7}/°$ C. The housing assembly with the housing and sealing enclosures enables the species transfer device to run efficiently through a range of pressures. The sealing enclosure can include drive hex spoke plates that cap the ends of the exchange matrix wheel, and a compression subassembly to maintain the hex spoke plates in compressive communication with the ends of the wheel.

39 Claims, 10 Drawing Sheets

U.S. PATENT DOCUMENTS

| | | | |
|---|---|---|---|
| 3,176,446 A | | 4/1965 | Siggelin |
| 3,183,649 A | * | 5/1965 | Teller ........................ 96/125 |
| 3,251,402 A | * | 5/1966 | Glav ........................... 96/125 |
| 3,398,510 A | * | 8/1968 | Pennington ................ 96/115 |
| 3,455,743 A | | 7/1969 | Huebscher et al. |
| 3,516,867 A | | 6/1970 | Dankese |
| 3,607,133 A | | 9/1971 | Hirao et al. |
| 3,666,007 A | | 5/1972 | Yoshino et al. |
| 3,669,751 A | | 6/1972 | Richman |
| 3,774,374 A | * | 11/1973 | Dufour et al. ............... 96/112 |
| 3,780,498 A | * | 12/1973 | Wenner ....................... 95/113 |
| 3,844,737 A | | 10/1974 | Macriss et al. |
| 3,865,924 A | | 2/1975 | Gidaspow et al. |
| 3,925,021 A | | 12/1975 | Yoshino et al. |
| 3,945,844 A | | 3/1976 | Nickols, Jr. |
| 3,958,058 A | | 5/1976 | Elmer |
| 4,012,206 A | | 3/1977 | Macriss et al. |
| 4,037,024 A | | 7/1977 | Landau |
| 4,075,396 A | | 2/1978 | Grehier |
| 4,093,435 A | | 6/1978 | Marron et al. |
| 4,124,408 A | * | 11/1978 | Eaton et al. ................. 134/3 |
| 4,125,408 A | | 11/1978 | Pieper |
| 4,134,743 A | | 1/1979 | Macriss et al. |
| 4,172,164 A | * | 10/1979 | Meyer et al. ................ 428/72 |
| 4,189,327 A | * | 2/1980 | Winchester, Jr. ............ 501/120 |
| 4,206,722 A | | 6/1980 | Nolley, Jr. |
| 4,255,171 A | | 3/1981 | Dravnieks |
| 4,276,071 A | | 6/1981 | Outland |
| 4,298,059 A | | 11/1981 | Krauth et al. |
| 4,324,564 A | | 4/1982 | Oliker |
| 4,343,631 A | | 8/1982 | Ciliberti |
| 4,364,760 A | | 12/1982 | Higuchi et al. |
| 4,364,761 A | | 12/1982 | Berg et al. |
| 4,398,927 A | | 8/1983 | Asher et al. |
| 4,402,717 A | | 9/1983 | Izumo et al. |
| 4,403,017 A | | 9/1983 | Bind |
| 4,404,007 A | | 9/1983 | Tukao et al. |
| 4,417,908 A | | 11/1983 | Pitcher, Jr. |
| 4,452,612 A | | 6/1984 | Mattia |
| 4,589,892 A | | 5/1986 | Leonard |
| 4,594,860 A | | 6/1986 | Coellner et al. |
| 4,695,301 A | | 9/1987 | Okajima et al. |
| 4,701,189 A | * | 10/1987 | Oliker ........................ 95/113 |
| 4,718,926 A | | 1/1988 | Nakamoto et al. |
| 4,732,593 A | | 3/1988 | Kondo et al. |
| 4,769,053 A | | 9/1988 | Fischer, Jr. |
| 4,824,740 A | | 4/1989 | Abrams et al. |
| 4,846,855 A | | 7/1989 | Tsujimoto |
| 4,856,577 A | | 8/1989 | Katsu et al. |
| 4,871,607 A | | 10/1989 | Kuma et al. |
| 4,967,726 A | * | 11/1990 | Finch ........................ 126/99 R |
| 5,057,128 A | | 10/1991 | Panzica et al. |
| 5,147,420 A | | 9/1992 | Claesson |
| 5,158,582 A | | 10/1992 | Onitsuka et al. |
| 5,169,414 A | | 12/1992 | Panzica et al. |
| 5,170,633 A | * | 12/1992 | Kaplan ........................ 62/94 |
| 5,194,154 A | | 3/1993 | Moyer et al. |
| 5,230,719 A | | 7/1993 | Berner et al. |
| 5,238,052 A | * | 8/1993 | Chagnot ..................... 165/8 |
| 5,275,771 A | | 1/1994 | Bush et al. |
| 5,512,083 A | | 4/1996 | Dunne |
| 5,542,259 A | | 8/1996 | Worek et al. |
| 5,542,968 A | | 8/1996 | Belding et al. |
| 5,580,370 A | * | 12/1996 | Kuma et al. ................ 96/154 |
| 5,702,508 A | | 12/1997 | Moratalla |
| 5,846,899 A | | 12/1998 | Kumazawa et al. |
| 5,937,933 A | | 8/1999 | Steele et al. |
| 6,004,384 A | * | 12/1999 | Caudle ....................... 96/125 |
| 6,013,385 A | | 1/2000 | DuBose |
| 6,080,227 A | | 6/2000 | Kurosawa et al. |
| 6,165,254 A | * | 12/2000 | Kawakami et al. ......... 96/125 |
| 6,183,895 B1 | * | 2/2001 | Kudo et al. ................. 429/20 |
| 6,199,388 B1 | * | 3/2001 | Fischer, Jr. ................. 62/90 |
| 6,210,626 B1 | | 4/2001 | Cornelius et al. |
| 6,235,086 B1 | * | 5/2001 | Fujimura .................... 95/113 |
| 6,274,259 B1 | | 8/2001 | Grasso et al. |
| 6,294,000 B1 | * | 9/2001 | Klobucar .................... 95/113 |
| 6,355,091 B1 | * | 3/2002 | Felber et al. ................ 95/10 |
| 6,361,585 B1 | * | 3/2002 | Anzai et al. ................. 95/113 |
| 6,406,522 B1 | * | 6/2002 | McFadden et al. ......... 95/113 |
| 6,436,562 B1 | * | 8/2002 | DuBose ...................... 429/13 |
| 6,478,855 B1 | * | 11/2002 | Okano ......................... 95/113 |
| 6,521,026 B1 | * | 2/2003 | Goto ........................... 96/122 |
| 6,526,674 B1 | * | 3/2003 | Fielding et al. ............. 34/80 |
| 6,527,837 B2 | * | 3/2003 | Kurosawa et al. .......... 96/125 |
| 6,575,228 B1 | * | 6/2003 | Ragland et al. ............. 165/54 |
| 2001/0009124 A1 | * | 7/2001 | Suzuki et al. ............... 95/113 |
| 2002/0071979 A1 | * | 6/2002 | DuBose et al. ............. 429/26 |
| 2003/0019357 A1 | * | 1/2003 | Tanaka et al. ............... 95/113 |
| 2003/0110945 A1 | * | 6/2003 | Wheat et al. ................ 95/113 |

\* cited by examiner

METHOD OF SPECIES EXCHANGE AND AN APPARATUS THEREFORE

CROSS REFERENCE TO RELATED APPLICATIONS

This application claims benefit of priority to U.S. provisional application 60/304,493 entitled "METHOD OF SPECIES EXCHANGE AND AN APPARATUS THEREFORE" filed on Jul. 11, 2001; and to U.S. provisional application 60/240,181 entitled "METHOD OF SPECIES EXCHANGE AND AN APPARATUS THEREFORE" filed on Oct. 13, 2000.

BACKGROUND OF THE INVENTION

1. Field of the Invention

The present invention relates generally to a method, apparatus, and system for the management and control of flow streams. The present invention is a method, apparatus, and system for transferring a portion of a species of a first stream to a second stream, and more specifically to sealing systems and enhancement techniques that can improve the efficiencies of such a species transfer device.

2. Description of Related Art

Conventional heat transfer devices designed to remove both sensible and latent heat are commonly referred to as "enthalpy exchangers." For example, rotary air-to-air heat exchangers have the ability to transfer heat, water vapor, or both between incoming and outgoing ventilation airstreams. Exchangers of the rotary wheel type typically incorporate a media of heat exchange material (capable of absorbing sensible heat) coated with a desiccant material (capable of adsorbing moisture, and, thus latent as well as sensible heat). The incoming airstream is directed through one sector of the slowly revolving wheel while an outgoing airstream is directed through another sector of the wheel. Passages formed in the heat exchange media permit passage of the streams through the wheel.

Use of these devices in ventilating, heating and/or air conditioning systems can reduce heating and cooling costs, while providing fresh outdoor air to lower internal air pollution levels. Heat and moisture are simultaneously absorbed from the warmer airstream at the one sector and removed from the wheel by the cooler, dryer airstream at the other sector. For stationary periodic flow regenerators, the airstream is alternately directed through the entire exchange device first in one direction and then in the opposite direction.

In a broader sense, a stream conditioning device like an enthalpy exchanger is a management device of species potential between streams flowing through the exchanger, wherein the species are, for example, latent and sensible heat. Species transfer devices that can be used particularly well in connection with a fuel cell engine are disclosed in U.S. Pat. No. 6,013,385 and U.S. application Ser. No. 09/447,764, both herein fully incorporated by reference. Such species transfer devices can be positioned in the path of at least one reactant stream of a fuel cell's inlet or outlet, which transfer devices condition that stream to improve the efficiency of the fuel cell.

In most fuel cell applications, relatively cool atmospheric air is used as the cathode reactant. The air must be heated and humidified before it is injected into the stack, or the membranes will dehydrate and the reaction will stop. In order to maintain proper operating conditions for the fuel cell, the temperatures and humidities of the anode and cathode circuits must be precisely controlled to avoid drying out the electrolyte or otherwise damaging the fuel cell, and thereby stopping the flow of electricity from the fuel cell. A sensible and latent heat transfer device such as an enthalpy wheel can be used for conditioning the pressurized oxidant. The enthalpy wheel operates by removing both sensible and latent heat from the fuel cell cathode exhaust stream to heat and humidify the cathode inlet stream.

The conventional enthalpy transfer device, such as a rotating heat exchanger for HVAC systems and the like, comprises a housing assembly incorporating a first and second inlet, and a first and second outlet, the housing assembly containing a rotatable heat wheel of exchange media with a desiccant. A heat-saturated first stream is routed through the first inlet and to an active section of the heat wheel, where sensible and latent heat are collected by the enthalpy wheel as the first stream passes therethrough via channels of the exchange media. Upon passing through the wheel, the first stream exits the assembly at the first outlet. As the enthalpy wheel rotates, this sensible and latent heat is released into the second stream, which second stream passes through the channels of the exchange media that were just traversed by the first stream. The rotation of the wheel causes each channel of the media to be exposed to the first stream, and then through a portion of heat wheel rotation, the second stream, alternately. The second stream thus accepts the heat of the first stream absorbed by the media and adsorbed by a desiccant of the heat wheel, and exits the housing via the first outlet. By controlling the rate of rotation of the enthalpy wheel and the rate of heat transfer, the relative humidity and wet bulb temperature of the streams can be controlled.

Through continued research and testing, it has been found that species transfer devices like those previously described can be improved upon in several respects. Namely, species transfer efficiencies can be optimized with certain modifications to the conventional transfer device. A first improvement is the provision of superior sealing systems limiting stream mixing during species transfer. The sealing system would prevent the higher-pressure stream from escaping into the lower-pressure stream. Preferably, the two streams do not mix at all in the housing. Yet another improvement includes the use of enhancement techniques to destabilize the thermal boundary level developed in the media, thus enhancing heat transfer. Further advantages are gained by varying the geometry of the media wheel, the types of media material used and the speed of rotation of the wheel, among many others. Another improvement includes formulating the heat wheel to resist changes in dimensions in response to changes in temperature. Thus it can be seen that a need yet exists for a lightweight and efficient means of species transfer that can be used in a number of different environments. It is to the provision of such a species transfer device meeting these and other needs that the present invention is primarily directed.

BRIEF SUMMARY OF THE INVENTION

Briefly described, in a preferred form, the present invention is a species transfer method, device, and system capable of managing species potential in a flow. In one aspect of the present invention, a stream conditioning system for a fuel cell gas management system is disclosed. The stream conditioning system manages species potential in fuel cell reactant streams. In another aspect, the species transfer device can comprise a media element, an optional sealing system and an optional enhancement system.

The media element is a rotatable exchange media element enclosed within a housing assembly. In one aspect of the invention, the media element preferably does not expand or contract significantly in response to changes in temperature. In another aspect of the present invention, the media element comprises an exchange medium, preferably a ceramic medium, more preferably a magnesium aluminum silicate having an average linear coefficient of thermal expansion (CTE) at 25 to 800° C. of less than about $20 \times 10^{-7}/°$ C., preferably less than about $10 \times 10^{-7}/°$ C., most preferably less than about $5 \times 10^{-7}/°$ C. In another aspect of the invention, the exchange medium has a CTE from about $1 \times 10^{-7}/°$ C. to about $20 \times 10^{-7}/°$ C., preferably about $2 \times 10^{-7}/°$ C. to about $10 \times 10^{-7}/°$ C., most preferred from about $3 \times 10^{-7}/°$ C. to about $8 \times 10^{-7}/°$ C. Having a CTE at 25 to 800° C. of less than about $20 \times 10^{-7}/°$ C. enables the exchange medium to preserve the integrity of seals separating different streams, or to avoid seals entirely, thereby preventing separate streams from intermixing or leaking. Exemplary transfer media include but are not limited to ceramics and ceramic composites including but not limited to magnesium aluminum silicates. Suitable transfer media include natural or synthetic cordierite, cordierite containing substances, modifed cordierites, or semi-cordierites. The media element can be a unitary cylinder of exchange media, or can comprise a plurality of cylindrically axial wedges insertable into a spoke carriage designed to secure such wedges.

The exchange medium can be, but need not be, in the form of a wheel, and can be composed of a substance having a low CTE and at least partial sorbent characteristics. Thus, the exchange medium can but need not have an added sorbent. A sorbent is herein defined as a substance that has the ability to take up and hold species, as by absorption or adsorption. The sorbent can be chosen for its particular characteristics vis-à-vis the species to be transferred. If the species transfer device is used to transfer latent heat between streams, the species transfer device can be comprised of a substance that transfers latent heat, or the species transfer device can have an added sorbent such as a desiccant. If the species is CO, then the sorbent is a substance that can collect and release CO between the streams. In other aspects, the exchange medium itself can be a sorbent.

The optional sealing system enables the species transfer device to run efficiently through a range of pressures and velocities of flows by limiting the amount, if any, of flow mixture within the device. The sealing system can include dynamic seals of either the contact or clearance type, including wagon wheel end caps, a mattress assembly or a labyrinth seal, among others, to provide a sealing relationship between the rotating ends of the exchange media wheel and the housing assembly. The labyrinth seal can be used in conjunction with a sealing fluid that does not saturate the exchange media and is injected into leak paths in the exchange media.

It will be appreciated by those of ordinary skill in the art, that the present invention encompasses formulating the exchange medium including preferably, the heat wheel, to resist changes in dimensions in response to changes in temperature. Therefore, in one aspect of the present invention, the heat wheel is formulated to have a CTE low enough to prevent the wheel from changing shape and thereby preventing inlet and exhaust streams from commingling. The species transfer device having such exchange medium optionally includes a sealing system.

The present invention can also include an enhancement system. The enhancement system is capable of reducing the flow boundary layer build-up in the media element. The enhancement system is a heat transfer augmentation methodology, and in the disclosed embodiments, the magnitude of heat transfer enhancements exceeds the additional pressure drop and any electrical power consumption penalties. Three distinct enhancement systems include electrohydrodynamic (EHD) enhancement, fluidic oscillation and media shuffling, although more than one type of enhancement system can be utilized in one transfer device.

The transfer device can be designed for single-pass or multiple-pass flow paths. A single-pass device accepts a flow from one side of the unit, and exhausts that flow on the other side of the unit, wherein the flow makes a single-pass through the exchange media. A multiple-pass device, for example a double-pass device, enables the flow to traverse the wheel twice before being exhausted. In this double-pass embodiment, the length of the wheel can be half that used in relation to the length of the wheel in the single-pass device, but the wheel would be larger in diameter than the single-pass wheel. In an alternative embodiment of the double-pass device, the flow may traverse the length of the housing assembly twice, but only encounter media in one trip (length) through the device. In this alternative double-pass embodiment, the length of the wheel can be equal to that used in relation to the length of the wheel in the single-pass device, but the wheel would be smaller in diameter than the double-pass wheel that has media in both passes.

The transfer device can further incorporate a pressure equalizing system to reduce the pressure differences between active sections of the exchange medium, wherein active sections of the exchange medium are those sections of the exchange medium in flow communication with a stream.

Yet another improvement provided by the present invention is the option of a disposable media element with or without the sealing system, being thus a single replaceable unit of the transfer device.

Accordingly, it is an object of the present invention to provide a species transfer device for conditioning a flow, which device is compact, lightweight and inexpensive.

It is another object of the present invention to provide a species transfer device for conditioning a second flow with species from a first stream.

Another object of the present invention is to provide a species transfer device that utilizes a revolving sealing system and a wheel of unitary construction.

An object of the present invention is the utilization of enhancement techniques to reduce flow boundary layer build-up in the media element.

Yet another object of the present invention is to provide a species transfer device that utilizes a revolving sealing system and a wheel being formed from a plurality of wedge sections.

It is another object of the present invention to provide a species transfer device having a mattress assembly to provide a sealing relationship between the rotating ends of the exchange media wheel and the housing assembly of the device.

Further, it is another object of the present invention to provide a species transfer device that includes a disposable media wheel unit.

Another object of the present invention is to provide a species transfer device that utilizes a labyrinth sealing system for high pressure environments.

It is yet another object of the present invention to provide a species transfer device including a pressure equalizing system.

Yet another object of the present invention is to provide a species transfer device that enables multiple-pass flow paths through the exchange media, wherein the passes may be co-and/or counter-flow.

These and other objects, features, and advantages of the present invention will become more apparent upon reading the following specification in conjunction with the accompanying drawing figures.

DETAILED DESCRIPTION OF A PREFERRED EMBODIMENT

Figure 1:
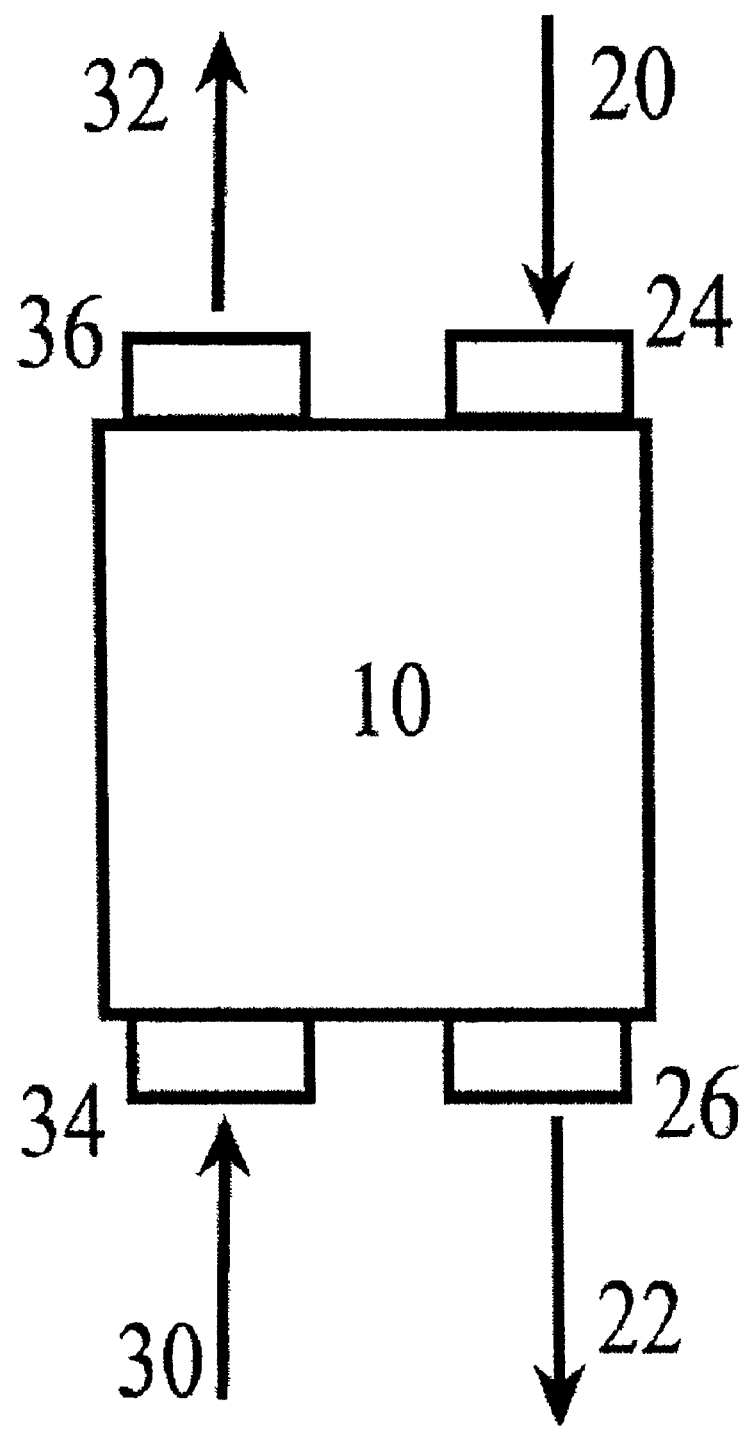
FIG. 1 is a diagram of the flow of oppositely directed streams through the species transfer device.

Referring now in detail to the drawing figures wherein like reference numerals represent like parts throughout the several views, in one embodiment, the present invention 10 comprises a housing assembly 40 containing a media element 80, an optional sealing system 45 and an optional enhancement system. At times, the present invention 10 is described in the context of one preferred embodiment, namely, a species transfer device for the management and control of various flow streams related to the operation of a fuel cell engine having a fuel cell. The species transfer device conditions at least one stream in communication with a fuel cell. Yet, this is only one of a number of embodiments of the present invention. In one disclosed preferred embodiment, the fuel cell of the fuel cell engine will be described as a proton exchange membrane (PEM) fuel cell.

Prior to discussion of the many improvements of the present invention, a general operational description is presented to provide context to the subsequent disclosure of novel embodiments.

Contextual Operational Presentation

A flow to be conditioned by the present species transfer device is defined as incorporating a potential of a species. Potential is used throughout as a term of relationship, describing the relative potential of a species between two or more flows. Potential will typically be used in context of one flow having a high potential of something (species), and another flow having a lower potential in that something (species) than the one flow, which context can be read as one flow having a higher potential of the species than does the other flow. Species is used throughout as a term describing a component of a flow that the transfer device seeks to at least partially remove from that flow, and transfer from that flow to another flow. The flow can be a species-containing flow of any state, but mainly will be described as a flow-stream of gas, for example, a reactant stream or the gaseous ambient environment.

The species transfer device can recycle a useful species that otherwise may be lost from a system. For example, the species transfer device can be used in connection with a fuel cell system, being located in the path of a fuel cell's inlet or outlet stream, which transfer device can condition that stream to improve the efficiency of the fuel cell. The species transfer device can also be placed in the paths of two or more of the fuel cell's inlet and outlet streams, wherein the streams enter the device through separate inlets.

The species transfer device communicates with at least two streams, one stream having a higher potential of a species than a lower potential stream. One of the streams can be the ambient environment. Keeping with the fuel cell engine embodiment description, only one of the two streams need be in the flow path of the fuel cell; that is, only one stream need be a fuel cell reactant stream. The other of the streams can be an exhaust stream or ambient, provided to the species transfer device simply to enable transfer of the species from or to this other stream from or to the fuel cell reactant stream.

The present species transfer device is capable of removing a portion of a species from a high potential stream, and transferring the removed species into a low potential stream. Again, in the context of a fuel cell engine, the species transfer device may be regarded in one sense as a removal system used to remove a portion of an unwanted species away from the engine. For example, the high potential stream can be a reactant stream in communication with the fuel cell, and the low potential stream can be an exhaust or purge stream not in communication with the fuel cell, wherein the unwanted or detrimental species is removed from the reactant stream and exhausted from the fuel cell engine via the low potential stream. Yet, even in this removal system embodiment, the species transfer device cannot simply remove the species from the reactant stream, but must then transfer the removed species to the exhaust/purge stream. Thus, when the ultimate function of the present transfer device is that of removing a detrimental species from the fuel cell engine, it still acts as a transfer system, not just a removal system.

If, on the other hand, both streams are in communication with the fuel cell, then the term "species transfer device" is a more adequate moniker, since the present device removes a portion of a wanted species from one reactant stream, and transfers it into the other reactant stream. In this context, the species is preferably kept in the fuel cell engine, to be used again, and not removed away from the engine.

Beyond fuel cell systems, other environments for the present species transfer device can include HVAC systems wherein the device is a heat exchanger, or a chemical process where various gasses and liquids may be removed, concentrated or transformed.

The Species Transfer Device

FIG. 1 illustrates the flow of oppositely directed streams, a first and second stream, through the species transfer device 10 of the present invention, according to a preferred form. A first stream 20 is shown entering the species transfer device 10 at the upper right through a first inlet 24. A second stream 30 is shown entering the system 10 at the lower left through a second inlet 34. Such positioning of the inlets 24, 34 is representative only for clarity of the drawings and accompanying description; the inlets 24, 34 need not be so located on the enthalpy transfer system 10.

If FIG. 1 is viewed as a part of the cathode loop of a fuel cell, first stream 20 (upon exit of the device through a first outlet 26, first exiting stream 22) could be air supplied to the fuel cell for use as the fuel cell's oxidant. The first stream 20 could be ambient air fed first through the species transfer device 10 before being sent to the fuel cell, which air has been both filtered and pressurized, and the second stream 30 could be the cathode exhaust stream exiting the fuel cell. In such an embodiment, it would be desirable to transfer the sensible and latent heat from the second stream 30 (cathode exhaust) to the first stream 20 (ambient air). The first exiting stream 22 would then contain a portion of the sensible and latent heat removed from the first stream 30,. leaving the second stream 30 (upon exit of the device through a second outlet 36, second exiting stream 32) without such portion of heat.

It will be understood that the species transfer device 10 need only communicate with one of a fuel cell's inlets and outlets. While the present transfer device must interrupt at least two streams, one having a higher potential of a species than the other in order to transfer a portion of the species from the higher potential stream to the lower potential stream, one of the streams can be independent from the fuel cell. The present species transfer device 10 can manage species transfer in fuel cell streams of fuel cell's that operate in a wide range of pressures, such as low pressure fuel cells and high pressure fuel cells.

Because the fuel cell of the fuel cell engine described operates best at elevated temperatures, it has been found desirable to heat and humidify the first exiting stream 22 (also referred to as the first reactant stream 22) supplied to the cathode inlet of the fuel cell in order to prevent the cathode air stream from drying out the electrolyte in the fuel cell. Thus, the preferred embodiment of the present conditioning system is as a species transfer device conditioning the first stream 20 with the species being sensible and latent heat to form first reactant stream 22.

Figure 2:
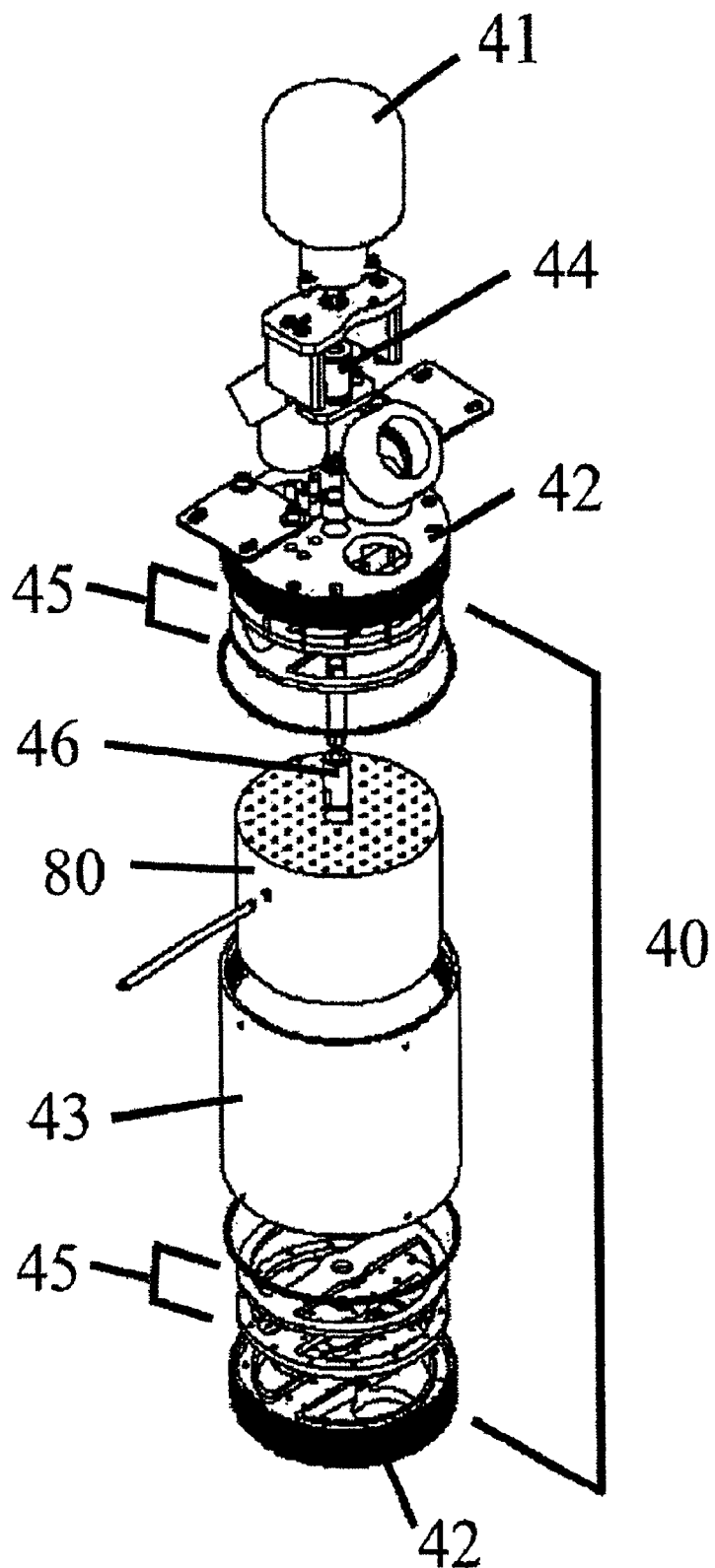
FIG. 2 is an exploded view of an exemplary species transfer device.

The species transfer device 10 according to a preferred embodiment is an enthalpy transfer device shown in an exploded view in FIG. 2 comprising a housing assembly 40 containing therein exchange media 80. The housing assembly 40 provides for the entrance and exhaust of both the first stream 20 and the second stream 30 therethrough via endplate 42, and further provides for the rotation of the exchange media 80 therein. The housing assembly 40 contains the exchange media 80 inside a housing enclosure 43 and between a sealing system 45. The exchange media 80 also may be referred to as an enthalpy or heat wheel 80.

The heat wheel 80 is disposed within the housing assembly 40 so that a portion thereof moves across the first stream 20 directed into the housing 43, while another portion simultaneously moves across the path of the second stream 30 directed into the housing 43.

The housing assembly 40 can further comprise a variable speed electric motor 41 to drive a shaft 44 coupled to a wheel shaft 46 to provide rotation to the enthalpy wheel 80 within the housing enclosure 43. Alternatively, heat wheel 80 can be rotated by various other devices, including belts and gears.

As used herein, the portion(s) of the media 80 being traversed by flows 20, 30 will be referred to as active sections of the media 80. An active section of the exchange media 80 is capable of capturing at least a portion of a first species of the second stream 30 such that the second stream exits the media with a smaller concentration of the first species. Upon rotation of the media wheel, the same active section of the wheel first exposed to the second stream 30 is then traversed with first stream 20, wherein the active section is capable of transferring at least a portion of the captured species to the first stream 20 such that the first stream exits the housing assembly 40 with a greater concentration of the first species. Although described as a first species transfer device between a first and second stream, the present species transfer device is capable of enriching the first stream with a second species captured from the second stream, and enriching the second stream with the first species from the first stream.

The exchange media 80 preferably is a porous material, for example, a ceramic including but not limited to cordierite, a structure of acrylic fiber or other material including high molecular weight synthetic polymers, aluminum, Kraft™ or NOMEX™ or other fibrous paper. In a preferred embodiment, the exchange medium can be a sorbent. For example, the exchange medium can be a silicate such as an aluminum silicate or magnesium aluminum silicate. In one embodiment, the exchange medium, preferably a ceramic medium, more preferably a magnesium aluminum silicate, has an average linear coefficient of thermal expansion (CTE) at 25 to 800° C. of less than about $20 \times 10^{-7}/°$ C., preferably less than about $10 \times 10^{-7}/°$ C., most preferably less than about $5 \times 10^{-7}/°$ C. In another aspect of the invention, the exchange medium has a CTE from about $1 \times 10^{-7}/°$ C. to about $20 \times 10^{-7}/°$ C., preferably about $2 \times 10^{-7}/°$ C. to about $10 \times 10^{-7}/°$ C., most preferred from about $3 \times 10^{-7}/°$ C. to about $8 \times 10^{-7}/°$ C. CTE is inversely proportional to thermal shock resistance, and therefore, a substance having a low CTE will also have an excellent thermal shock resistance such that the substance can survive large changes in temperature. In another embodiment, the exchange medium is ceramic or ceramic composite, preferably a magnesium aluminum silicate, having an average linear CTE at 25 to 800° C. of about $1 \times 10^{-7}/°$ C. to about $20 \times 10^{-7}/°$ C., preferably about $2 \times 10^{-7}/°$ C. to about $10 \times 10^{-7}/°$ C., most preferred from about $3 \times 10^{-7}/°$ C. to about $8 \times 10^{-7}/°$ C., optionally having an added sorbent, preferably a desiccant. Exemplary substances having low CTEs include cordierite and cordierite containing substances. In one embodiment of the present invention, the heat wheel is formulated to have a CTE low enough to prevent or reduce the wheel from changing shape, preferably by less than about 0.001 inches in any direction in response to changes in temperature such that the inlet and exhaust streams do not commingle. The species transfer device having such a heat wheel optionally includes a sealing system.

Cordierite is a crystalline magnesium aluminum silicate having an average linear coefficient of thermal expansion reported to be in the range of 12 to $16 \times 10^{-7}/°$ C. It has relatively high refractoriness and a melting point of about 1460° C. Cordierite has been used in cookware, dinnerware, and in catalytic converters of automobiles. U.S. Pat. No. 4,298,059 discloses the use of cordierite in a recuperative heat exchanger. U.S. Pat. No. 4,967,726 discloses a heat wheel made of cordierite used in heating and ventilation systems for buildings. U.S. Pat. No. 6,183,895 discloses the use of cordierite as a carrier for a metal in a reforming catalyst used in a fuel cell power generating system. U.S. Pat. No. 5,702,508 discloses the use of cordierite as a ceramic rotor used to dry gases.

In another preferred embodiment, the exchange medium contains about 50 to about 100% cordierite, modified cordierite, semi-cordierite, natural, artificial, stoichometric, or nonstoichiometric; preferably at least about 60%; more preferably at least about 70% cordierite, modified cordierite, semi-cordierite, natural, artificial, stoichometeric, or nonstoichiometric. Stoichiometric cordierite has a theoretical formula ($2MgO.2Al_2O_3.5SiO_2$) and a composition of about 13.8% MgO, 34.8% $Al_2O_3$ and 51.4% $SiO_2$.

Modified cordierite compositions include cordierite compositions having portions of the silicon dioxide replaced with other oxides including but not limited to germanium oxide as disclosed in U.S. Pat. No. 4,403,017 or calcium oxide. The cordierite compositions can be stoichiometric, nonstoichiometeric or approximately stoichiometric, natural or artificial, modified or semi-cordierite. In still other embodiments, the exchange medium is honeycombed.

Cordierite and cordierite containing substances and their methods of production are well known in the art. For example, U.S. Pat. No. 6,210,626 to Cornelius et al. discloses methods of producing cordierite bodies using substantially reduced firing times. U.S. Pat. No. 4,189,327 to Wincherster et al. disclose methods of producing semi-cordierite. U.S. Pat. Nos. 4,124,408 and 4,403,017 disclose modified cordierite substances. All of the references cited herein are incorporated by reference. U.S. Pat. No. 5,702,508 to Moratalla discloses a ceramic desiccant device that can be comprised of cordierite. It will be understood that the exchange media of the present invention can have sorbent or desiccant properties itself, or the exchange media can be in combination with a sorbent such as a desiccant. In embodiments where the exchange media and a sorbent such as a desiccant are in combination, the desiccant may be added to the exterior of the exchange media or may be combined with the exchange media such that the sorbent permeates the exchange media.

Figure 3:
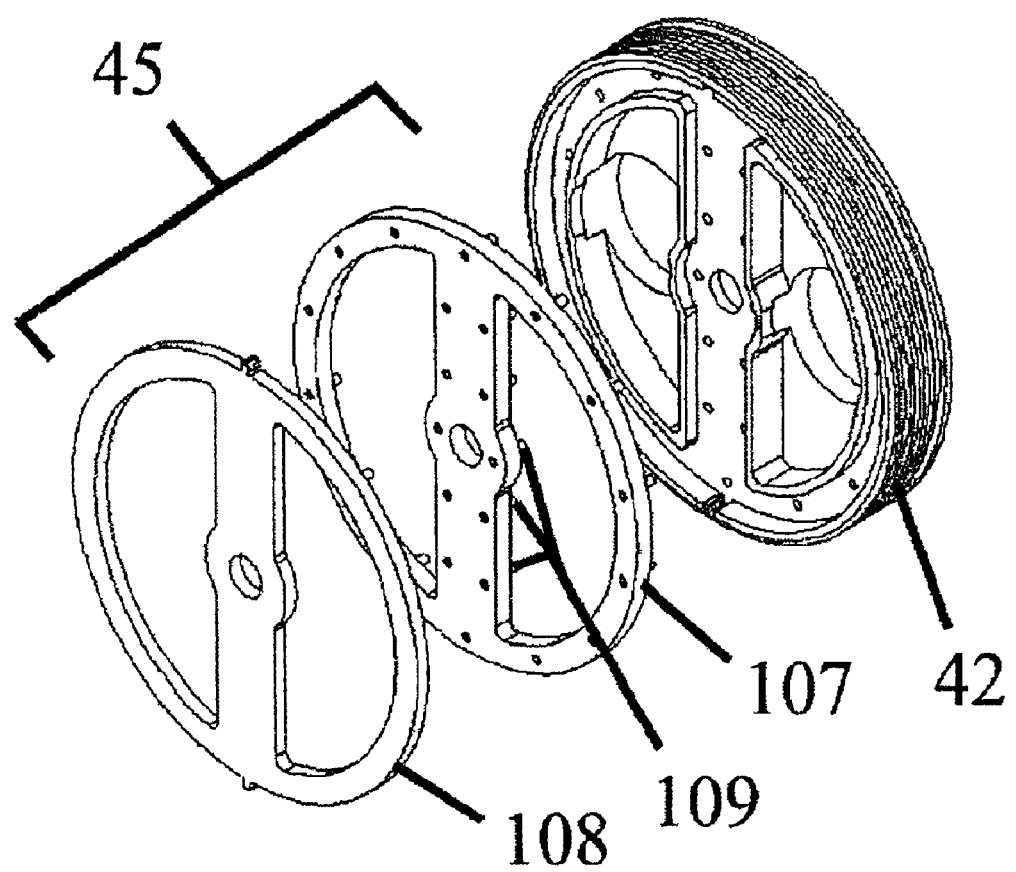
FIG. 3 is a diagram of an exemplary sealing system and endplates.

Sealing system 45 of FIG. 3 provides a diametrical seal between the two flow paths 20 and 30. Sealing system 45 can comprise a contact seal 108. Contact seal 108 can be made of low friction material. Suitable low friction materials include but are not limited to Teflon™ Peek™. In one embodiment, seal 108 is In direct contact with the end of media 80 and is maintained there by constant pressure exerted by an arrangement of springs 109 acting between the housing end 43 and the seal plate 108. The variable space between the seal plate 108 and the housing end 43 can be sealed, preferably by a congruent gasket, more preferably by a silicon gasket, that allows axial movement of the seal plate 108 while preventing flow between the seal plate 108 and the end of the housing 43 This slight axial movement allows for thermal expansion of the assembly and for wear of the sealing surfaces.

In other embodiments, the exchange media 80 comprises channels connecting first and second axial faces, a core, and a rim. Alternatively, the media wheel 80 may be a solid cylinder of media, without a core. The wheel 80 includes a plurality of parallel channels, which can generally be in the form of a hexagon in cross section, among other geometries. In one preferred embodiment, the channels are rectangular, more preferably square. The walls of the channels have a minimum thickness to inhibit the effect of the wall thickness increasing the pressure drop through the wheel 80 and yet provide the wheel 80 with sufficient structural integrity to be self supporting. The channels can be sized such that a distance between and along longitudinal axes of adjacent channels is generally uniform. Thus, the channels of the media 80, due to their hexagonal cross-sectional configuration, are closely adjoined to increase the available transfer surface per unit of volume. The use of channels having a cross section that is generally in the form of a hexagon is advantageous over other geometries, such as sinusoidal, square, and triangular as the hexagon shape provides a greater available transfer surface area (i.e., based upon standard measurements and calculations of the geometries after coating of the interactive material) than the transfer surface area of a sinusoidal, triangle or square for a given volume. Further, the pressure drop through a media formed of hexagonal channels is significantly less than media constructed of the other geometries because there is virtually no buildup in the corners of the generally hexagon shaped channels; hence, the power necessary to force the flow through the media is less than that of the other geometries.

Generally, the larger the surface area of the exchange media, the more efficient the exchange media. Suitable surface areas of an exchange media are about 2000–5000 $meters^2/meters^3$ with appropriately sized channels. It will be appreciated that the exchange media can have more or less surface area depending on the desired efficiency of the media. Although in a preferred embodiment, the hexagonal flow channels extend axially through the entire length of the wheel 80, in the direction of first and second stream flow, the size and orientation of the channels can vary according to need, but must be sufficiently small to maximize the total surface area for species transfer, yet sufficiently large relative to their length to minimize resistance to the stream flow.

Alternatively, the exchange media 80 can comprise of a plurality of interrelated small diameter, heat-retentive fibrous materials, which, relative to the prior art, appear random. The interrelation or interconnection of such fibrous material, whether by mechanical or chemical means, results in a mat of material of sufficient porosity to permit the flow of the streams, yet of sufficient density to induce turbulence into the streams and provide surface area for heat transfer.

Figure 4:
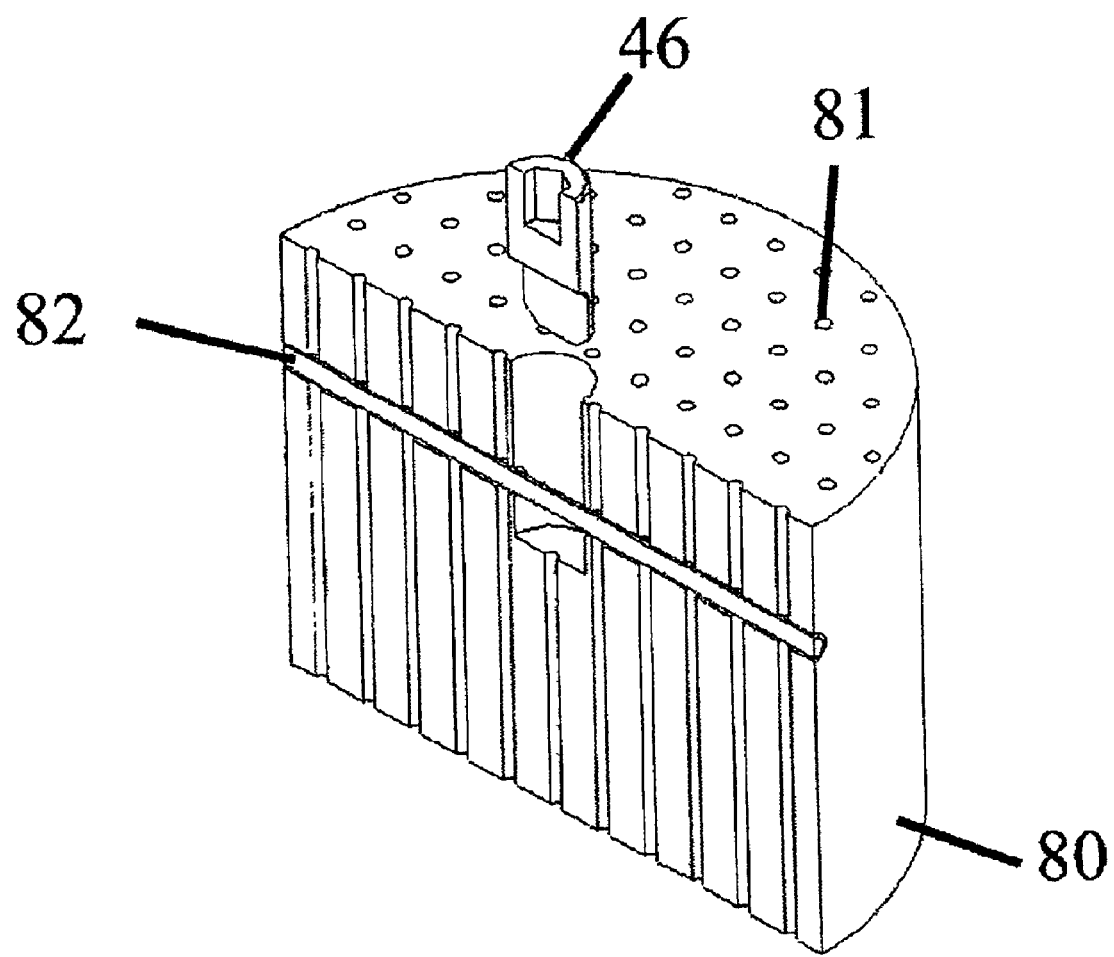
FIG. 4 is a cross-sectional perspective view of an exemplary exchange media.

In a preferred embodiment illustrated in FIG. 4, exchange media 80 comprises a silicate, preferably a magnesium silicate, more preferably a magnesium aluminum silicate such as cordierite, in a single unit. The ceramic media 80 is a honeycombed structure having flow passages traversing end to end The media 80 is not permeable between passages causing streams entering one end of a passage to traverse the passage and exit on the opposite end of the passage. Streams entering a given passage will exit the same passage at the opposite end regardless of pressure differential between adjoining passages.

In embodiments in which exchange media 80 comprises material having a low CTE such as cordierite or other silicates, the ends 81 are polished to help form a tight seal against seal plate 108. The exchange media cylinder 80 is driven by motor shaft coupling 46 through a diametrical rod 82. The rod 82 distributes the motor torque through the delicate silicate material to avoid damaging the exchange media. The rod 82 can also be coated with a substance to cushion the torque transfer. Suitable coating substances include elastomers, plastics, polymers, silicone, gums, or the like.

In still another embodiment, the exchange media 80 can be optionally coated with a sorbent, which according to a heat wheel embodiment, can be a water selective molecular sieve or desiccant. Exemplary desiccants include but are not limited to silica gel, activated alumina, gamma alumina, titanium silicate, glycols, calcium chloride, lithium chloride or other hydrophilic materials. In one embodiment, the desiccant-coated exchange media provides surface area for moisture transfer. A sorbent is herein defined as a substance that has the ability to take up and hold species, as by absorption or adsorption. The sorbent is chosen for its particular characteristics vis-à-vis the species to be transferred. If the species transfer device is used to transfer latent heat between streams, the sorbent can be a desiccant. If the species is CO, then the sorbent is a substance that can collect and release CO between the streams.

The pore size of the sorbent(s) of the media 80 can be chosen to selectively entrap or filter one or more species from the inlet or exhaust streams. Alternatively, additional wheels can be installed in the path of the stream(s), for selective filtering more than one species. In this manner, for example, by selectively filtering nitrogen from the anode inlet stream of a fuel cell engine with a nitrogen transfer device (or nitrogen sweep) of the present invention, the partial pressure of oxygen in the cathode inlet stream of the fuel cell engine can be increased, thereby providing more efficient fuel cell operation.

The suitable sorbents can include zeolites. Zeolites are highly crystalline alumino-silicate frameworks comprising $[SiO_4]^{4-}$ and $[AlO_4]^{5-}$ tetrahedral units. T atoms (Si, Al) are joined by oxygen bridges. Introduction of an overall negative surface charge requires counter ions e.g. $Na^+$, $K^+$ and $Ca^{2+}$. The zeolite crystals contain water, and as the water is driven off by heating, there is no discernible collapse of the framework structure. This leads to a highly crystalline, microporous adsorbent that has an internal structure which can be easily tailored to adsorb any number of species.

Zeolites have beneficial molecular sieving properties. The pore size distribution can be modified, enabling the zeolite to be used as a so-called molecular sieve. Molecules which are too large to diffuse into the pores are excluded, whereas molecules which have a kinetic diameter smaller than the pore size, diffuse into the pores, adsorb and under certain conditions are capable of undergoing catalytic reactions. An example of this is in the sieving of straight and branched chain hydrocarbons to increase the octane number of gasoline.

The zeolite framework consists of Si and Al atoms connected by oxygen bridges. Introduction of Al atoms into the framework produces a charge imbalance due to the difference in valance of Si and Al. This charge imbalance is countered by the introduction of cations (e.g., calcium, sodium). The introduction of Al into the framework has several effects:

i. introduction of an electric field-makes the zeolite more hydrophilic;
ii. introduction of catalytic centers;
iii. introduction of ion-exchange properties; and
iv. lowers the thermal stability of the zeolite.

Zeolites also have beneficial ion-exchange properties. As mentioned above, the introduction of Al into the zeolite framework produces ion-exchange properties. Ions in solution can be exchanged for ions within the zeolite framework. These ions can be univalent, divalent or even tri-valent in nature.

The mass of the wheel 80 can transport sensible and latent heat. In an alternative embodiment, the wheel is coated with a sorbent that traps and transfers water vapor molecules and, thereby, latent heat. Synthetic fiber-based energy conservation known in the art has been found to provide acceptable heat transfer performance, and to resist attack by deionized water.

Figure 5:
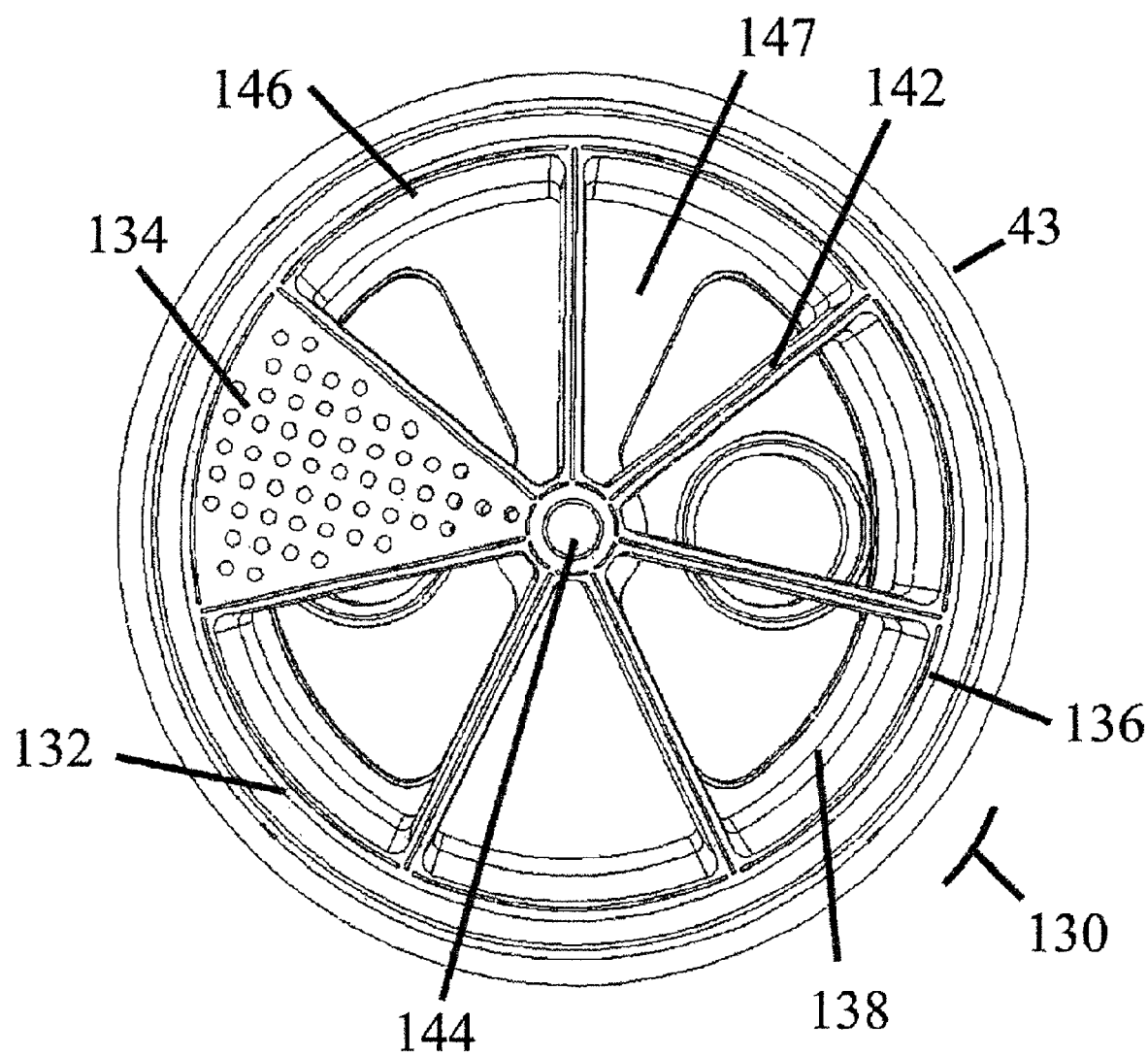
FIG. 5 is a diagram of an alternative embodiment of the present invention in which the exchange media is enclosed in a spoke carriage assembly designed to hold a plurality of exchange media units.

FIG. 5 illustrates an alternative embodiment of the present invention in which the exchange media 80 is enclosed in a spoke carriage assembly 130 designed to hold a plurality of exchange media units, preferably wedged units 134. The media carriage 132 is composed of a central axle 144 connected to a series of radial partitions 142 that are in turn connected to a cylindrical shell 146. Thus, carriage assembly 130 resembles a revolving door open on the ends. The carriage assembly 130 partitions serve to compartmentalize the media to prevent leakage between passages.

The carriage assembly 130 is sealed on each end 136, 138 by a direct contact seal 147. This seal 147 is similar to that shown in FIG. 3 except that it is triangular to match the wedge geometry of this embodiment. It will be appreciated that seal 147 can be in any geometric conformation depending upon the geometry of the exchange media units. As FIG. 5 illustrates grooves may be added to the carriage assembly ends to form labyrinth seals against the sealing plate 147.

The sealing system 45 can further comprise a labyrinth seal for high pressure environments. The labyrinth seal can be used in conjunction with a sealing fluid injected into leak paths in the wheel to raise the dynamic pressure required for leakage. Suitable sealing fluids include those that do not interfere with species transfer or saturate the exchange media.

Figure 6:
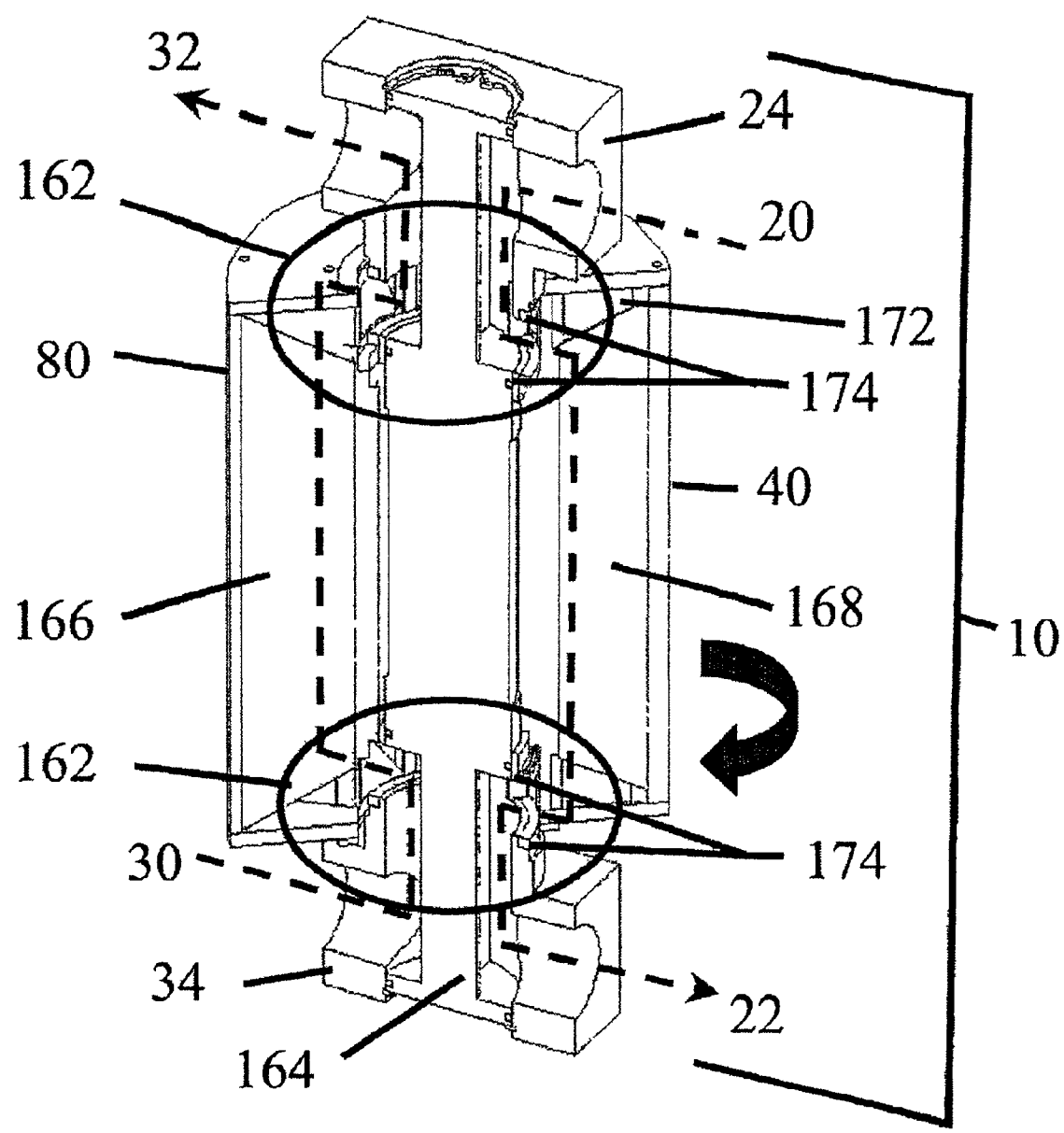
FIG. 6 is a cross-sectional view of an exemplary embodiment of the present invention.

A labyrinth seal can alternatively be used with a heat wheel 80 as shown in FIG. 6 wherein a rotary valve 162 is in radial form. The radial seal 164 divides the heat wheel 80 into two sides, with wedges 166 on the left separated from the wedges 168 on the right. The spokes 172 hold pressure, and wiping seals 174 keep the streams from intermixing. In this embodiment of the species transfer device 10, the inlets 24, 34 of the housing enclosure 42 direct the first and second entering streams 20, 30 into the rotary valve 162. By rotating the housing 40, the first and second streams flow axially through the alternating media wedges 166 and 168.

The present invention further comprises enhancement techniques to destabilize the boundary level developed in the media, thus enhancing heat transfer. Enhancement techniques include, among others, electrohydrodynamic (EHD) enhancement, fluidic oscillation and media shuffling.

Prior efficiency gains have been the modification of heat exchangers to use enhanced surfaces, such as attached/integral fins, porous coatings, reentrant cavities and internal grooving. EHD couples a high-voltage, low-current electric field with the flow field of a low electrical conductivity fluid medium. EHD utilizes the effect of electrically-induced secondary motions to destabilize the thermal boundary layer near the heat transfer wall, thereby leading to increased turbulence or mixing of the bulk flow and substantial heat transfer enhancement. The magnitude and nature of enhancements are a direct function of electric field parameters (such as field potential, polarity, pulse vs. steady discharge, electrode geometry and spacing); flow field parameters (such as flow Reynolds number and the working fluid properties); and heat transfer surface conditions (e.g., smooth or integrally finned/grooved configurations). The net effect is to increase the heat transfer coefficient, sometimes by several hundred percent.

To use EHD, an electrical voltage needs to be added to the heat transfer device. Depending on the application, anywhere from a few volts to thousands of volts are used. However, because the heat transfer fluids are typically dielectric (low electrically conductive) materials, very little current is generated, despite the high voltage. This low current helps keep the power (voltage times current) and the associated energy penalty small. The electronics needed also represent an increased material cost.

The present device 10 can comprise a wire or plate electrodes parallel and adjacent to the heat transfer wheel 80. The specific enhancement mechanism is strongly dependent on the type of fluid and the heat transfer process involved. For example, in gases, corona discharge, known as the ionic wind or corona wind, is the primary driving force behind the heat transfer enhancements. The corona wind effect may be thought of as a free jet that is discharged into a fluid of the same type. Interaction of the corona wind with the main stream flow enhances bulk mixing of the flow field leading to higher heat transfer rates. For phase-change applications, the EHD mechanism is driven by the compound combination of various effects such as convection and turbulence generated by charge injection of the fluid, surface instability effects, and a EHD liquid extraction phenomenon.

When EHD is utilized, it will be understood that a dialectic flow must be used; and that deionized water is dielectric. The use of EHD can enable the unit 10 to be smaller than without enhancement.

Another enhancement technique to destabilize the boundary layer developed in the media is liquid oscillation, wherein sonic waves are used to break up the boundary layer.

Figure 7:
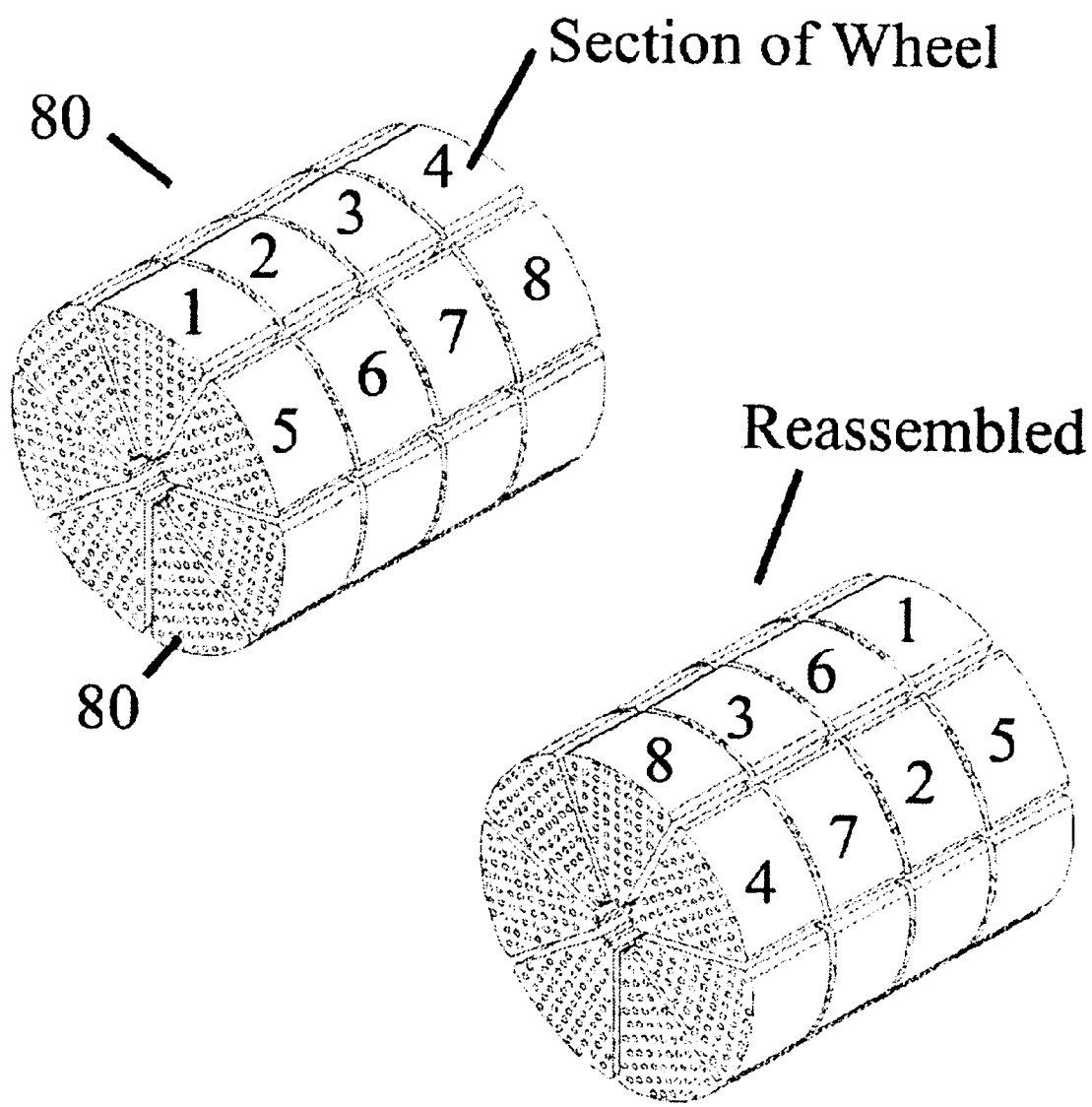
FIG. 7 is a diagram illustrating the enhancement technique of media slicing.

FIG. 7 illustrates the enhancement technique of media slicing, wherein the channels of the media wheel 80 are not all aligned; thus providing at least some interrupted passages through the length of the media wheel. One way to accomplish such media slicing is to cross-sectionally cut the media at various lengths, and to reassemble the media with interchangeable sections of the media. At points of interruption of the channels along the length of the media wheel, the boundary layer is subject to turbulence.

The previously described embodiments of the present transfer device relate to single-pass devices, that is, where a stream flows through a single length of the exchange media. The stream enters the housing assembly 40, flows through the media, and then exits the assembly. The transfer device of the present invention can further incorporate a double-pass embodiment, wherein at least one of the streams flows through two lengths of the enclosure, typically passing through two lengths of the exchange media. A stream enters the housing, flows in one direction through the exchange media, encounters the other end of the spoke carriage which redirects the stream to flow the other way through the exchange media, and then exits the housing. It will be understood that a stream can be directed to flow through the exchange media more than twice. Alternatively, the stream may only pass through the media along one of its travels down and up the enclosure. In such systems, the media wheel would be smaller in diameter and longer than would the device if the stream passes through the media on each trip.

Figure 8:
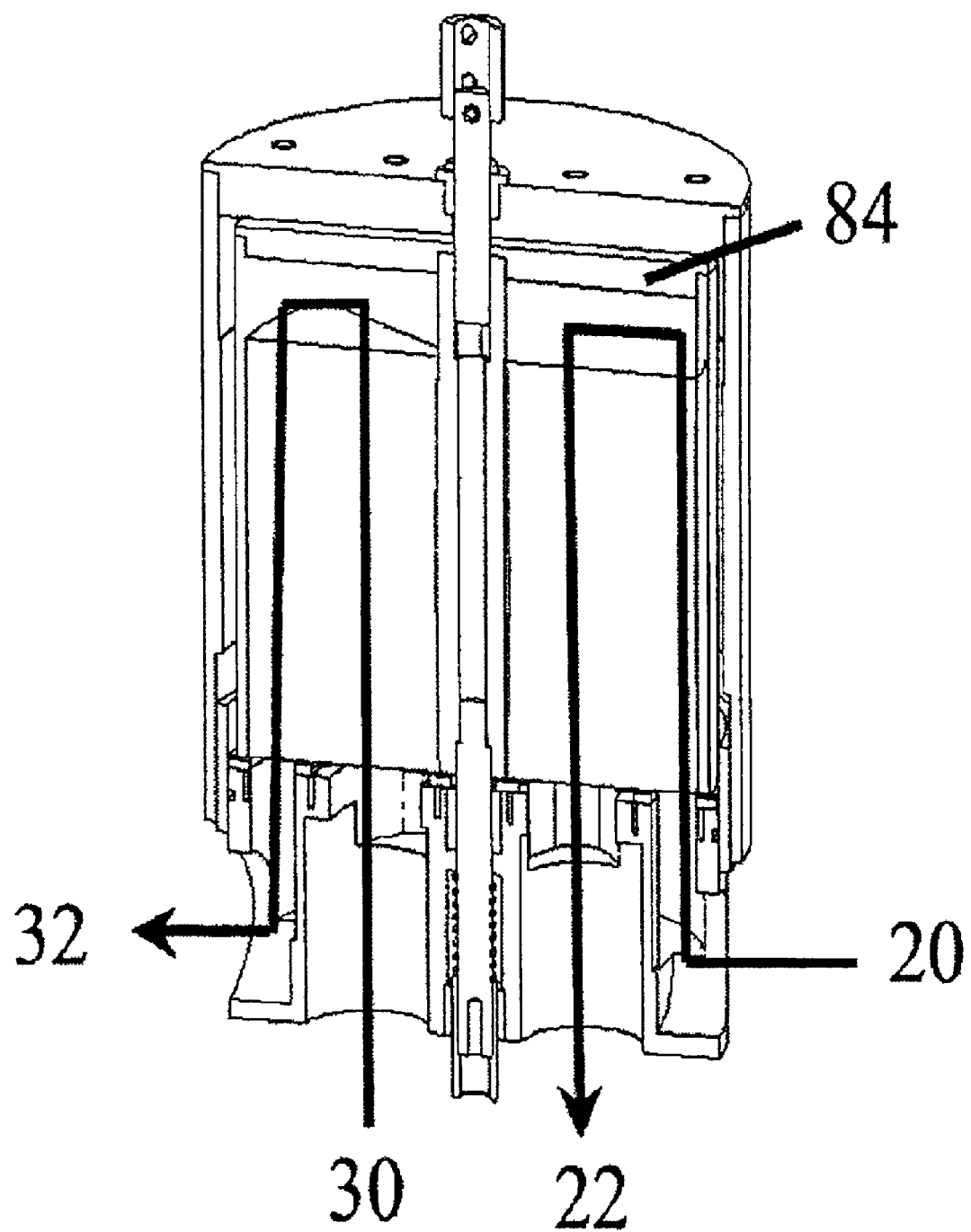
FIG. 8 is a diagram showing a double-pass transfer device.

The double-pass transfer device comprises a housing assembly 40 having all the inlet and outlets at one end, the path end of the housing. Such an embodiment is shown in FIG. 8. The heat wheel is divided both annularly and in half, along the length of the wheel, such that four media sections are provided, a first and second half core and a first and second outer ring. The first stream 20, for example fresh air, is directed by a first inlet at the path end of the housing through the first half core, and redirected at the other end of the spoke carriage, the redirecting end, to pass through the first outer ring before exiting through the first outlet. The second stream 30, for example exhaust, is directed by a second inlet through the second outer ring, and redirected at the redirecting end of the housing to pass through the second half core before exiting through the second outlet. In this embodiment, between the redirecting end of the housing and the wheel is located a redirecting end plate held in compressive communication with the wheel by springs or glue. The double-pass embodiment can also use the fully divided spoke carriage concept.

Figure 9:
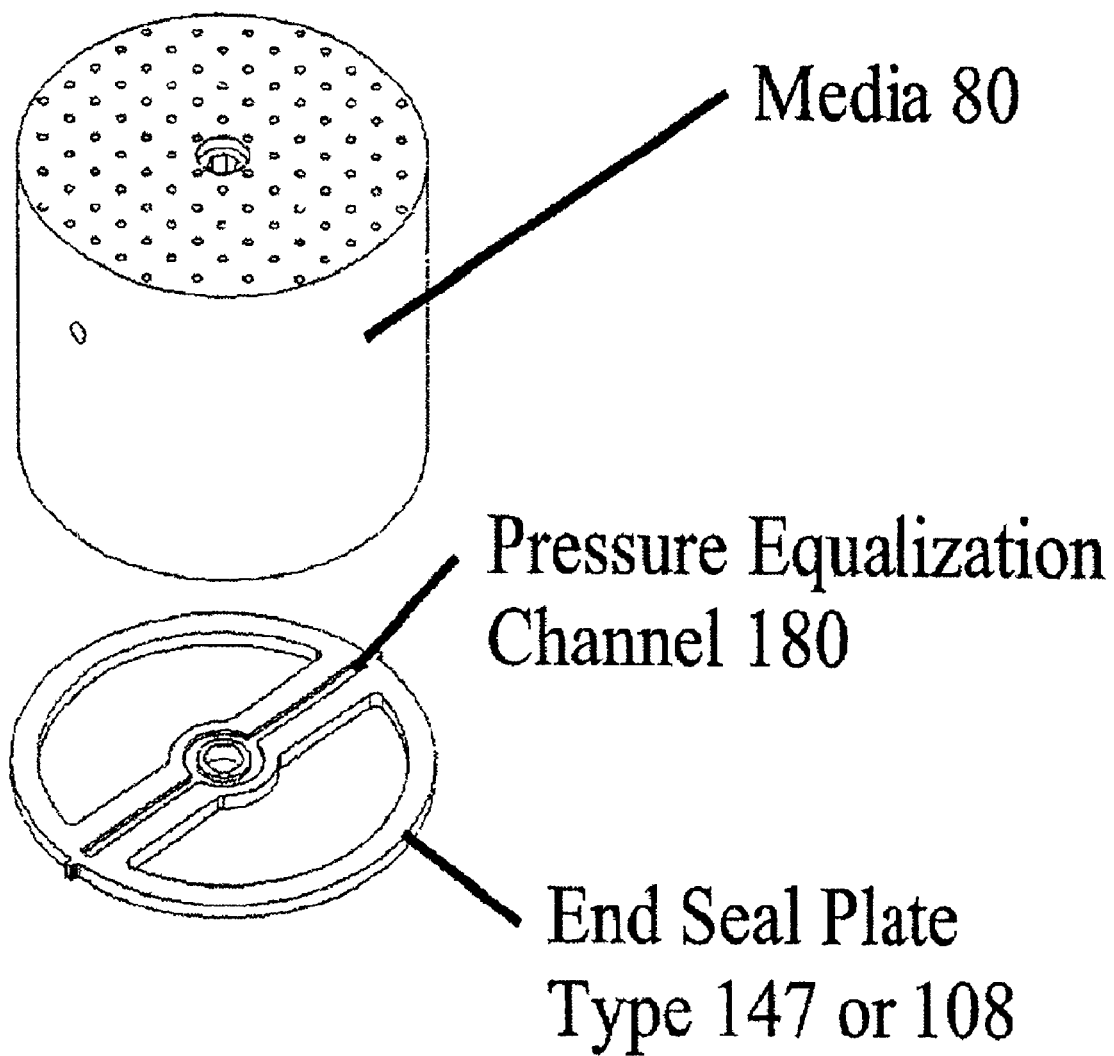
FIG. 9 is a diagram illustrating the incorporation of a pressure equalizing in the present invention.

Further, as illustrated in FIG. 9, the transfer device can incorporate a pressure equalizing system or pump-over compensator 180 to reduce the pressure differences between active sections of the wheel, wherein active sections of the wheel are those sections in flow communication with one of the streams. It has been found that if the pressure difference between two active sections of the heat wheel (one active section having the first stream flow therethrough and the second active section of the wheel having the second stream flow therethrough) is greater than approximately one psi, the device emits a heartbeat sound as each active wedge opens up to/from ambient pressure to the stream pressure. The heartbeat sound indicates that air is leaking across the wheel, which leads to inefficient operation of the transfer device. The housing enclosure and sealing system can be designed so as to vent pressure from a pressurized wedge section to an ambient wedge section, which can cut the pressure differential in half, improving the efficiencies.

The present invention can include a fully disposable heat wheel incorporating a fixedly secured sealing system so upon opening the housing, the heat wheel and sealing components can be replaced as a single unit. In this embodiment, the ends of the heat wheel are securely fixed with a gasket, a seal combination, and a return cap.

Figure 10:
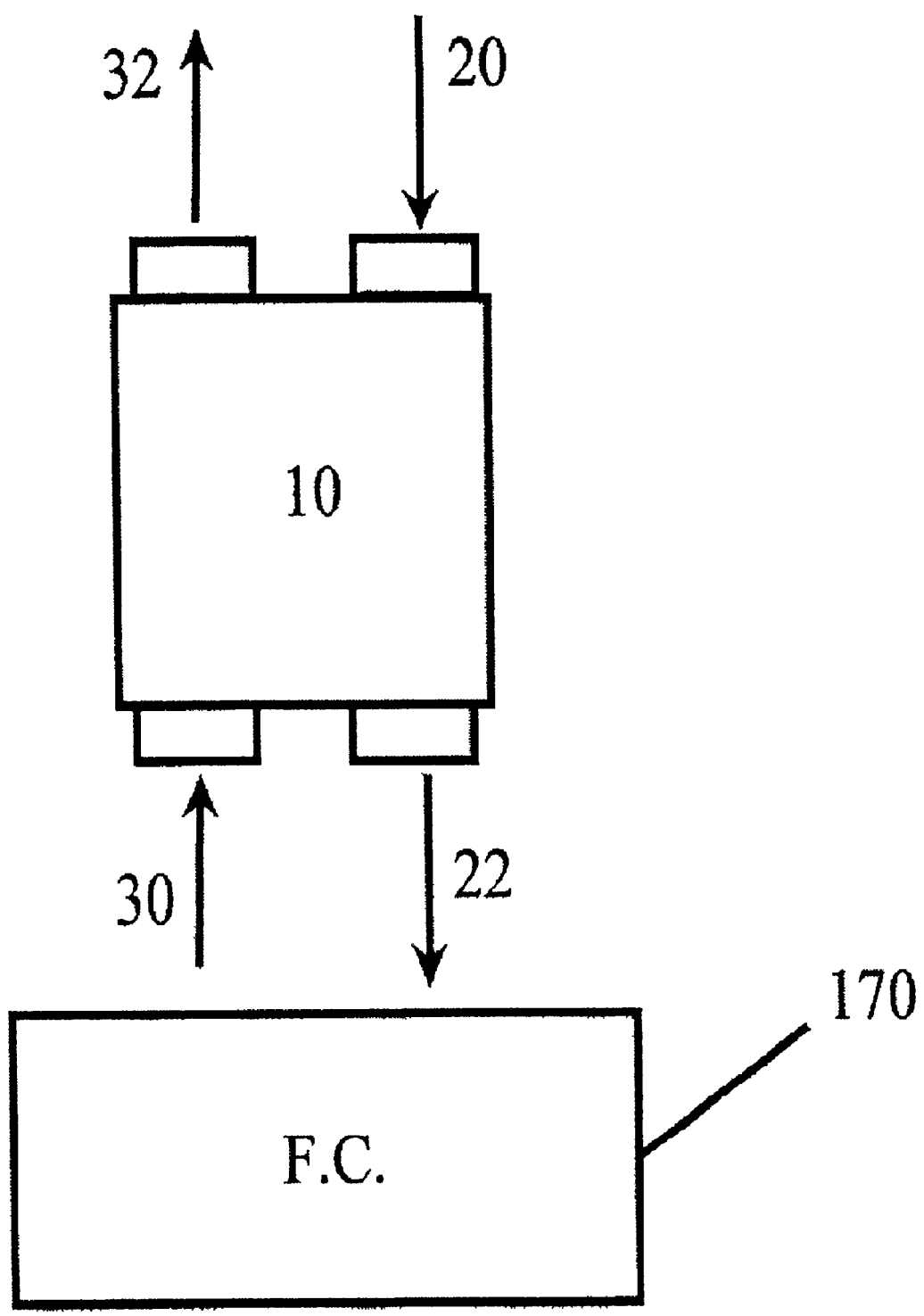
FIG. 10 is an illustration of an exchange media of the present invention in combination with a fuel cell.

FIG. 10 shows the present invention 10 in combination with a fuel cell 170. The enthalpy transfer device containing the exchange media 80 removes a desired species from stream 30 and releases it into stream 20 to form stream 22.

Representative examples of the operation of the present device will again focus on fuel cell system. Yet, fuel cell systems are but one type of environment for the present invention. In fuel cell applications, the present species transfer device can be used as a heat transfer device in communication with a fuel cell engine. A fuel cell engine can comprise a cathode loop, an anode loop, and a cooling loop, each loop in communication with a fuel cell. The present device can manage the species of any one, or more than one, of the streams flowing through these loops. In such a fuel cell engine, a first reactant is typically circulated through the cathode loop. The first reactant is introduced to the fuel cell through an inlet, and is removed from the fuel cell through an exhaust. Similarly, a second reactant is circulated through the anode loop. The anode reactant is introduced to the fuel cell through an inlet, and is removed from the fuel cell through an exhaust. The cooling loop can circulate deionized water through the fuel cell via a cooling water inlet and a cooling water discharge, and is used to reject heat from the fuel cell. The cooling loop can alternatively circulate other liquids or gases that can remove heat from the fuel cell.

The present species transfer device used in connection with the cathode loop of a fuel cell system can be in the embodiment of a sensible and latent heat transfer device. A first stream is defined as having a higher potential of heat than a second stream, wherein it is preferable to recapture some of the heat for reuse in the fuel cell engine, rather than having the heat simply exhausted away from the engine. Therefore, the present invention is used both to remove a portion of the heat (latent, sensible or both) from the first stream, and to transfer the heat to the second stream. In this example, heat is the species, and the two streams differ in their potential of this species, so that heat is transferred by the present invention from a high potential stream to a low potential stream. In one embodiment sensible heat and latent heat would be transferred via the exchange media of the heat transfer device. In another embodiment the majority of the sensible heat is transferred by the exchange media of the heat transfer device, while the latent heat would be transferred via an optionally added sorbent, such as a desiccant.

The sensible and latent heat transfer device transfers sensible and/or latent heat from the cathode reactant's inlet or outlet stream to the reactant's other of the inlet or outlet stream. The direction of transfer of these species, sensible and latent heat will, as described above, depend on which stream has a higher potential of sensible and/or latent heat. "And/or" is used here because it is possible that the present device may transfer one such species from a reactant's inlet stream to a reactant's outlet stream, while concurrently transferring another such species from the outlet stream to the inlet stream. For example, a fuel cell cathode reactant inlet stream may have a lower potential of latent heat and a higher potential of sensible heat than those of the cathode reactant outlet stream. As such, the sensible and latent heat transfer device embodiment of the present invention would transfer a portion of the cathode reactant outlet stream's latent heat to the cathode reactant inlet stream, and would transfer a portion of the cathode reactant inlet stream's sensible heat to the cathode reactant outlet stream.

In such a sensible and latent heat transfer device embodiment of the present invention, the exchange media can be in the form of an enthalpy wheel. The exchange media can be comprised of a material that is able to transfer both sensible and latent heat. In an alternative embodiment, the exchange media can be in combination with a sorbent, preferably in the form of a desiccant. Depending on stream potentials, the enthalpy wheel can operate by removing both sensible and latent heat from the fuel cell cathode reactant exhaust stream to heat and humidify the cathode reactant inlet stream. Because the water vapor sorbed from the cathode reactant exhaust is desorbed into the cathode reactant inlet stream, it is unnecessary to provide external energy (in the form of heat of vaporization) in transferring moisture removed from the cathode reactant exhaust to the cathode reactant inlet by the enthalpy wheel.

The optional desiccant of the sensible and latent heat transfer device is capable of removing moisture from the cathode reactant exhaust stream, which removal releases heat and raises the exhaust stream temperature, which in turn heats the media of the enthalpy wheel. This same heat is used to power the release phase in the cathode reactant inlet stream upon rotation of the enthalpy wheel. A desiccant material naturally interacts with moisture from gases and liquids. The material becomes saturated as moisture interacts with the desiccant; but when exposed to a dryer stream, the desiccant releases moisture—or regenerates—and can be used again. The enthalpy wheel of the present invention can include solid desiccants, for example, silica gel, activated alumina, gamma alumina, lithium chloride salt, and molecular sieves. Titanium silicate, a class of material called 1m, and synthetic polymers are newer solid desiccant materials designed to be more effective for cooling applications. Alternatively, the enthalpy wheel can include liquid desiccants, for example, lithium chloride, lithium bromide, calcium chloride, and triethylene glycol solutions.

If the cathode loop of the fuel cell engine further incorporates a turbo charger or compressor, the sensible and latent heat transfer device of the present system can operate to transfer each of these two species in opposite directions, as described above. The sensible heat transferred from the inlet to the exhaust, and the latent heat transferred from the exhaust to the inlet.

Other common species in reactant streams of a fuel cell include air, oxygen, hydrogen, nitrogen, carbon monoxide, carbon dioxide, sulfur dioxide and methanol.

The present species transfer device can also be in the flow path of three or more streams. For example, in an embodiment of a fuel cell engine having a fuel cell with a cathode loop and an anode loop, the cathode and anode exhaust streams can both reject a species into the species transfer device, to be transferred into a lower potential third stream.

As the present species transfer device is provided to transfer a species from a stream with a high potential of that species to a stream with a lower potential of that species, at least one stream being in communication with a fuel cell, the size of the pores in the exchange media of the wheel can be varied, and optionally, a sorbent can be added to selectively filter out different types of species. For example, in an enthalpy wheel used in connection with the cathode loop of the fuel cell engine, the optional sorbent can be a desiccant to transfer moisture from the exhaust stream to the inlet stream. Alternatively, the sorbent can be sized to filter nitrogen and other species of the cathode reactant inlet stream, thereby increasing the partial pressure of oxygen in the inlet stream to increase fuel cell efficiency. In a preferred embodiment, the media exchange 80 has sorbent characteristics itself. Such embodiments do not incorporate an added sorbent.

In some cases, what would normally be the cathode reactant inlet and outlet streams are instead sent to the anode side of a fuel cell. The species transfer device for the cathode reactant inlet and outlet described above is equally applicable to the case where such reactant is sent instead to the anode side.

The anode loop of a fuel cell engine can include another embodiment of the present species transfer device, namely a contaminant sweep. The contaminant sweep is another type of species transfer device, for example, a CO sweep, which helps remove CO from the anode reactant to a fuel cell engine, as CO is bad for certain catalysts in the fuel cell, including platinum. Thus, in this embodiment, the present species transfer device can comprise an exchange media with a sorbent that is sized to remove CO from the anode reactant. In this embodiment, the device is used not so much for transferring the CO between anode inlet and outlet streams, but is used for removing CO from the anode loop. Yet, the exchange media with a sorbent can only remove a species if it can move it from a high potential stream to a low potential stream. So, in effect, the present transfer device can remove CO from the anode reactant stream if it can transfer it to another stream having a lower potential or concentration of CO.

Other contaminant sweep embodiments of the species transfer device can be located along any loop of the fuel cell engine, and can include, without limitation, a methanol sweep in the cathode loop to capture or catalyze fugitive methanol from a direct methanol fuel cell engine, a nitrogen sweep to capture nitrogen from the cathode inlet stream, and a reformer product gas sweep to capture $CO_2$ from the reformer outlet in a fuel cell engine incorporating a reformer. It will be understood that while the fuel cell engine can incorporate a methanol sweep to transfer methanol away from the engine and into, for example, the atmosphere, the preferable methanol sweep would be better termed a methanol catalyzer, described hereinafter.

The present species transfer device also can be used with direct methanol fuel cells (DMFCs). A DMFC can use a liquid methanol fuel feed, which eliminates the complexity and weight penalties of a reformer generally used in a fuel cell engine. In the DMFC, the anode catalyst itself draws the hydrogen from the liquid methanol, eliminating the need for a fuel reformer. The species transfer device of the present invention used in connection with a DMFC engine can be a methanol catalyzer to catalyze fugitive methanol on the cathode side of the DMFC that migrates through the fuel cell from the anode side. The present system can convert the methanol to heat via a catalyst, and transfer the heat back into the cathode inlet stream. A catalyst can be included in the enthalpy wheel in the cathode loop to catch the fugitive methanol. The catalyst can be mixed with the sorbent. The fugitive methanol is catalyzed by the enthalpy wheel, generating heat that is reused. Unlike cracking the methanol with a catalytic converter that wastes the heat of cracking, use of the methanol sweep embodiment of the present system recirculates that heat, producing a more efficient DMFC engine.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A species transfer device designed for communication with a first and second stream of a fuel cell, the device comprising:
    (a) a housing assembly having a first stream inlet and outlet, and a second stream inlet and outlet; and
    (b) an exchange matrix housed within said housing assembly; wherein the exchange matrix has an average linear coefficient of thermal expansion at 25 to 800° C. of less than about $20 \times 10^{-7}/°$ C.
    said housing assembly providing a path for said first stream of a fuel cell entering the first stream inlet, traveling through said exchange matrix, and exiting the first stream outlet, and providing a path for said second stream of a fuel cell entering the second stream inlet, traveling through said exchange matrix, and exiting the second stream outlet;
    said species transfer device capable of transferring a portion of a species from one of said first stream and said second stream to the other of said first stream and second stream, thereby conditioning said fuel cell streams.

2. The species transfer device of claim 1, further comprising a sealing system.

3. The species transfer device of claim 2, the media exchange matrix and sealing system being a unitary element being easily disposable.

4. The species transfer device of claim 2, the sealing system comprising a labyrinth seal optionally used in conjunction with a sealing fluid injected into leak paths in the exchange matrix.

5. The species transfer device of claim 2, the sealing system comprising a mattress assembly on either end of the exchange matrix, the mattress assembly providing a sealing relationship between the ends of the exchange matrix and end caps frictionally engaging the inside of the housing assembly.

6. The species transfer device of claim 1, said exchange matrix being capable of rotation within said housing assembly.

7. The species transfer device of claim 6, said exchange matrix being a cylinder of a porous material, said exchange matrix having a first and second end and a central core therethrough.

8. The species transfer device of claim 7, further comprising a pressure equalizing system to reduce the pressure differences between active sections of the exchange matrix, wherein active sections are those sections of the exchange matrix in flow communication with a stream.

9. The species transfer device of claim 6, said exchange matrix divided into fully segmented sections.

10. The species transfer device of claim 6, said housing assembly further comprising a driving device capable of providing rotation to said exchange matrix.

11. The species transfer device of claim 1, wherein said exchange matrix having sorbent characteristics.

12. The species transfer device of claim 1, wherein said exchange matrix in combination with a sorbent.

13. The species transfer device of claim 1, wherein said exchange matrix is a magnesium aluminum silicate.

14. The species transfer device of claim 13, wherein said magnesium aluminum silicate is cordierite.

15. The species transfer device of claim 1, wherein said exchange matrix is at least 50% cordierite.

16. The species transfer device of claim 1, the exchange matrix being a unitary cylinder of exchange media.

17. The species transfer device of claim 1, further comprising an electrohyrodynamic enhancement technique.

18. The species transfer device of claim 17, the electrohyrodynamic enhancement technique being fluidic oscillation.

19. The species transfer device of claim 1, further comprising a media shuffling enhancement technique.

20. The species transfer device of claim 1, the device being a single-pass device.

21. The species transfer device of claim 1, the device being a double-pass device.

22. The species transfer device of claim 1, the first stream having a first potential of a first species and a second potential of a second species, the second stream having a lower potential of the first species than the first stream and a higher potential of the second species than the first stream, the species transfer device capable of transferring a portion of the first species from the first stream to the second stream and a portion of the second species from the second stream to the first stream.

23. The species transfer device of claim 1, said housing assembly having a third stream inlet and outlet, said housing assembly capable of providing a path for a third stream entering the third stream inlet, traveling through said exchange matrix, and exiting the third stream outlet;
    said species transfer device capable of transferring a portion of a species from the first stream and the second stream to the third stream.

24. A species transfer device designed for communication with a first and second stream of a fuel cell, the device comprising:
    (a) a housing enclosure having a first stream inlet and outlet, and a second stream inlet and outlet, and further having an inner surface;
    (b) an exchange matrix element, said exchange matrix element having an average linear coefficient of thermal expansion at 25 to 800° C. of less than about $20 \times 10^{-7}/°$ C. and being in the form of a cylinder having a first and second end, and a central core therethrough; and
    said housing enclosure providing a path for said first stream of a fuel cell entering said first stream inlet, traveling through said exchange matrix element, and exiting said first stream outlet, and providing a path for said second stream of a fuel cell entering the second stream inlet, traveling through said exchange matrix element, and exiting the second stream outlet;
    said first stream having a higher potential of a species than said second stream, said species transfer device capable of transferring a portion of the species from the first stream to said second stream.

25. The species transfer device of claim 24, further comprising a sealing system, said sealing system discouraging interactions between the first and second streams as they flow in and out of said housing enclosure.

26. The species transfer device of claim 25, the sealing system comprising wagon wheel end caps located on either end of the exchange matrix element, the end caps frictionally engaging the inside of the housing enclosure.

27. The species transfer device of claim 26, having first and second end places each incorporating at least two spokes, a center and an outer ring, each said spoke extending radially between the center and outer ring, said first and second end plates serving to cap the ends of said exchange matrix in order to provide a seal between said exchange matrix and the inner surface of said housing enclosure.

28. The species transfer device of claim 27, the species being latent heat, and further comprising a compression subassembly comprising a compression spring running through said central core of said exchange matrix, the ends of said spring being attached to the centers of said first and second end plates.

29. The species transfer device of claim 27, the species being sensible heat, and said ends of said exchange matrix being provided with radially grooves extending from said core of said exchange matrix, said spokes of said end plates capable of fitting into said radial grooves wherein the number and orientation of said radial grooves match the number and orientation of said spokes of said end plates.

30. The species transfer device of claim 25, the sealing system comprising a spring loaded device to apply a sealing force to sealing plates.

31. The species transfer device of claim 25, the sealing system comprising a labyrinth seal optionally used in conjunction with a sealing fluid injected into leak paths in the exchange matrix element.

32. The species transfer device of claim 24, the exchange matrix element being a plurality of cylindrically axial wedges insertable into a spoke carriage designed to secure such wedges.

33. The species transfer device of claim 24, wherein said exchange matrix element is in combination with a sorbent.

34. The species transfer device of claim 24, said exchange matrix element is a magnesium aluminum silicate.

35. The species transfer device of claim 34, said magnesium aluminum silicate is cordierite.

36. The species transfer device of claim 24, said exchange matrix element comprising at least 50% cordierite.

37. The species transfer device of claim 24, further comprising an enhancement system.

38. A species transfer device designed for communication with a first and second stream of a fuel cell, the device comprising:
(a) a housing assembly having a first stream inlet and outlet, and a second stream inlet and outlet; and
(b) an exchange matrix housed within said housing assembly, said exchange matrix comprised of a magnesium aluminum silicate having an average linear coefficient of thermal expansion at 25 to 800° C. of less than about $16 \times 10^{-7}/°$ C.;

said housing assembly providing a path for said first stream of a fuel cell entering said first stream inlet, traveling through said exchange matrix, and exiting said first stream outlet, and providing a path for said second stream of a fuel cell entering said second stream inlet, traveling through said exchange matrix, and exiting said second stream outlet;

said species transfer device capable of transferring a portion of a species from one of the first stream and the second stream to the other of the first stream and second stream.

39. A fuel cell stream conditioning system comprising:
(a) a species transfer device, wherein the species transfer device contains an exchange medium, wherein the exchange medium 1 comprises a ceramic medium having an average linear coefficient of thermal expansion at 25 to 800° C. of less than about $16 \times 10^{-7}/°$ C.;
(b) a first stream of a fuel cell directed through the species transfer device; and
(c) a second stream of a fuel cell directed through the species transfer device;

said species transfer device transferring a portion of a species from one of said first stream and said second stream of a fuel cell to the other of said first stream and second stream of a fuel cell.

* * * * *

UNITED STATES PATENT AND TRADEMARK OFFICE
CERTIFICATE OF CORRECTION

PATENT NO. : 6,780,227 B2
DATED : August 24, 2004
INVENTOR(S) : Ronald Arthur DuBose et al.

It is certified that error appears in the above-identified patent and that said Letters Patent is hereby corrected as shown below:

Column 17,
Line 41, after "claim 2, the" delete "media";

Column 20,
Line 30, after "exchange medium" delete "1".

Signed and Sealed this

Eighth Day of February, 2005

JON W. DUDAS
*Director of the United States Patent and Trademark Office*